United States Patent [19]

Uraneck et al.

[11] 4,125,481
[45] Nov. 14, 1978

[54] MIXING OF ORGANOSULFUR MOLECULAR WEIGHT MODIFIER WITH EMULSIFIER FOR EMULSION POLYMERIZATION SYSTEMS

[75] Inventors: Carl A. Uraneck; John E. Burleigh, both of Bartlesville, Okla.

[73] Assignee: Phillips Petroleum Company, Bartlesville, Okla.

[21] Appl. No.: 825,803

[22] Filed: Aug. 18, 1977

Related U.S. Application Data

[62] Division of Ser. No. 314,107, Dec. 11, 1972, Pat. No. 4,064,337.

[51] Int. Cl.$^2$ ............................................. B01J 27/02
[52] U.S. Cl. ................................ 252/431 C; 252/426; 252/431 R

[58] Field of Search ............... 526/204, 213, 221, 222, 526/223, 225, 251, 293, 295, 328, 330, 335, 340, 341, 344; 252/426, 431 C, 431 R

[56] References Cited

U.S. PATENT DOCUMENTS

| 3,267,061 | 8/1966 | Senior et al. ................. 260/880 R X |
| 3,396,153 | 8/1968 | Vitalis et al. ..................... 526/225 X |

Primary Examiner—Patrick Garvin

[57] ABSTRACT

Organosulfur molecular weight regulators for emulsion polymerization systems, such as mercaptan compounds, are mixed and agitated with the aqueous emulsifier prior to use in emulsion polymerization systems. The modifying efficiency of the organosulfur molecular weight modifiers can be controlled by the degree of agitation. In many cases, adding the agitated mixture incrementally to the emulsion polymerization system further improves effectiveness of the modifier.

17 Claims, No Drawings

MIXING OF ORGANOSULFUR MOLECULAR WEIGHT MODIFIER WITH EMULSIFIER FOR EMULSION POLYMERIZATION SYSTEMS

This application is a divisional application of our copending application Ser. No. 314,107 filed Dec. 11, 1972 now U.S. Pat. No. 4,064,337 patented Dec. 20, 1977.

FIELD OF THE INVENTION

The invention relates to emulsion polymerization systems employing organosulfur compound molecular weight modifiers.

BACKGROUND OF THE INVENTION

Organosulfur molecular weight modifiers or regulators in emulsion polymerization systems have exhibited somewhat variable efficiencies. Higher molecular weight species, particularly of the mercaptan compounds, possess relatively low chain transfer effectiveness. Lower molecular weight species have higher volatilities which has caused problems with respect to residual odor.

OBJECTS OF THE INVENTION

It is an object of the invention to improve the effectiveness of organosulfur compounds as molecular weight modifiers in emulsion polymerization systems.

Other aspects, objects, and advantages of the invention will become apparent from a study of the disclosure and the appended claims.

BRIEF SUMMARY OF THE INVENTION

The emulsifier and organosulfur modifier are admixed and agitated prior to being added to the emulsion polymerization system. The coagitation improves the reactivity of the organosulfur compound, and the degree of agitation permits control of the reactivity, i.e., adjustment of the regulating index, of the organosulfur modifier. The benefits of agitation have been found to be most pronounced when the coagitated emulsifier-organosulfur modifier combination then is added to the emulsion polymerization system on a monitored, i.e., incremental or continuous, basis over at least a portion of the polymerization time.

DETAILED DESCRIPTION OF THE INVENTION

Our invention applies to emulsion polymerization processes in which the control or modification of polymer molecular weight is effected by means of a chain transfer mechanism employing organosulfur compounds as chain transfer agents or molecular weight regulators or modifiers.

In the process of our invention, the emulsifier and the organosulfur compound are admixed and coagitated prior to their introduction into the balance of the polymerization mixture. This preagitation, which can be accomplished by a variety of methods, markedly increases the reactivity of the organosulfur compounds as modifiers. Moreover, the effect of agitation has been found to be advantageous in many cases, i.e., where the regulating index as defined below has a value greater than about 4 under conditions of a standard commercial polymerization rate for SBR-type systems (see C. A. Uraneck and J. E. Burleigh, Kautschuk and Gammi Kunststoffe 19, 532-542 [1966]), if the emulsifier/organosulfur compound combination, after coagitation, then is added to the rest of the polymerization mixture on a monitored, i.e., incremental or continuous, basis.

Additionally, and desirably, at constant rate of shear in the coagitation of the admixture of modifier and emulsifier, lengthening of the agitation time interval also increases the intensity of the effect obtained, at least up to an ultimate maximum value, and in any case significantly higher than the original reactivity of the organosulfur compound. Alternatively, maintaining constant mixing time and increasing the rate of shear also produces this effect.

The increased activity of the organosulfur modifier makes it possible to use reduced amounts of such regulating compound in a given system than otherwise would be required, providing that the regulating index as defined below is less than optimum, e.g., less than about 4 in SBR-type systems (see Uraneck and Burleigh, vide supra). The increased reactivity obtained according to the method of our invention also makes practical the employment in emulsion polymerization systems of organosulfur compounds of higher molecular weight than otherwise practical, thus reducing or minimizing the hazard of residual organosulfur compound odor in the ultimate product.

The increase in reactivity of a modifier can be interpreted quantitatively as an increase in the regulating index as measured by the rate of depletion of the modifier. Specifically, the regulating index, $r$, is defined as $$r = - d(\ln S)/dX$$

wherein S represents the concentration of organosulfur compound and X the fractional conversion. Coagitation of the mixture of modifier and emulsifier affords a range of $r$ values within limits based on the reactivity of the organosulfur compound and the intensity and duration of agitation. As illustrated in examples below, it is possible through coagitation to raise the $r$ value of t-hexadecyl mercaptan above the $r$ value of t-dodecyl mercaptan that has not been coagitated with emulsifier.

COAGITATION

The agitation employed refers to the strong and thorough mixing of the organosulfur compound modifier or regulator with at least a portion of the emulsifier, preferably as an aqueous emulsifier, i.e., emulsifier-water solution, in such manner as to afford significant reduction in the particle size of the organosulfur compound. The amount or degree of mixing is that sufficient to effectuate the extent of improvement in regulating index desired. The agitation generally is sufficient to form an emulsion sufficiently stable for feeding in a monitored fashion. Coagitation of only the modifier and emulsifier is distinguished from the ordinary preemulsification which may occur as the complete polymerization mixture is tumbled or otherwise agitated when being brought to the desired polymerization temperatures. Coagitation or preagitation takes place prior to the preemulsification step.

Coagitation of modifier and emulsifier may be accomplished by any suitable means including tumbling action, stirring, shearing action, application of high frequency vibrations, or the like. Various mills, in which the walls of the vessel, blades, or vanes of a stirrer, and the like, can be utilized to provide the necessary shearing action and/or coagitation. One suitable device is an ultrasonic bath such as a Model G140-25 made by the National Ultrasonic Corporation which imparts a work force of ultrasonic energy upon the components to be admixed according to the process of our invention. Preagitation should be performed under an inert atmosphere, such as nitrogen, helium and the like, to avoid loss of organosulfur compound.

In the coagitation process, the time employed may depend upon the particular method or milling device chosen, but should at least be sufficient to provide the desired increase in modifier activity. The optimum time interval for a desired degree of agitation depends on the efficiency of the equipment used and the particular components and modifiers employed. The frequency and force of collision and the wave frequency, intensity, and absorbing capacity of the ultrasonic milled components all may vary with the time employed. More vigorous operations require reduced time, e.g., effective agitation can occur with tumbling in about 70 to 100 hours, with ultrasonic vibration in 1 to 2 hours, and with high speed shearing action in a very few minutes such as about 5 minutes. For ultrasonic vibration, the time employed expediently may range from about 10 to 0.5 hours, preferably from 2 to 1 hour. Ultrasonic vibration frequency where employed expediently may be in the range of 20 to 1,000 kc/s, kilocycles per second. The intensity, i.e., average rate of energy flow per unit area of the ultrasonic bath, may vary from such as about $10^{-4}$ to upwards of 20 watts per square centimeter. The coagitation process is carried out under an inert atmosphere, e.g., nitrogen.

Modifiers

The process of our invention is applicable to any organosulfur molecular weight modifier or regulator employed in an emulsion polymerization system. Types of organosulfur modifiers include the presently preferred mercaptans, as well as such as the dialkyl dixanthogens, diaryl disulfides, tetraalkylthiuram mono and disulfides, mercaptothiazoles, and the like.

Most used commercially at present are the mercaptan compounds, and of these presently are preferred the hydrocarbyl mercaptans containing 8 to 20 carbon atoms per molecule, alkyl, including primary, secondary, and tertiary, cycloalkyl, cycloalkenyl, cycloalkadienyl, aryl, and combinations such as alkaryl and aralkyl compounds. The more preferred mercaptan modifiers are those of tertiary alkyl configuration.

The amount of organosulfur modifier employed may vary widely, depending upon the particular compound or mixture chosen, the polymerization temperatures, the emulsifier and other recipe ingredients, and the extent of results or modification desired. Our invention provides a method which permits the option of employing higher molecular weight organosulfur compounds than could otherwise be employed in view of the capability of coagitation of modifier with emulsifier to raise r values. Satisfactory modification can be obtained by employing on the order of 0.01 to 5 phm parts organosulfur compound per 100 parts monomer by weight, with 0.05 to 2 phm presently being preferred, though greater or lesser amounts may be utilized where desired.

Examples of suitable organosulfur compounds include n-octyl mercaptan, n-dodecyl mercaptan, t-nonyl mercaptan, t-dodecyl mercaptan, t-hexadecyl mercaptan, t-octadecyl mercaptan, t-eicosyl mercaptan, sec-octyl mercaptan, sec-tridecyl mercaptan, cyclododecyl mercaptan, cyclododecadienyl mercaptan; aryl mercaptans such as 1-naphthylenethiol, and the like; bis(tetrahydrofurfural xanthogen), diphenyl disulfide, tetramethyl thiuram disulfide, 2-mercaptobenzothiazole, and the like. Mixtures or blends of any of these organosulfur compounds can also be used. Commercially available and suitable organosulfur compound modifiers often are mixtures of organosulfur compounds, e.g., mixtures of t-dodecyl, t-tetradecyl, and t-hexadecyl mercaptans.

Emulsifying Agents

A wide variety of emulsifying agents can be employed satisfactorily to produce the desired monomer emulsion in aqueous medium, including rosin acid soaps, disproportionated rosin acid soaps, fatty acid soaps, mixtures of disproportionated rosin acid soaps with fatty acid soaps, alkaryl sulfonates, and other surface active materials and mixtures thereof. Nonionic emulsifiers also can be employed including polyethers and polyols.

Amounts of emulsifying agent employed depend on the type and reaction parameters and monomer concentrations. An expedient range would be about 0.5 part to 10 phm. The relative amounts of emulsifier:modifier can range widely depending on monomers, species, reaction parameters, degree of modification desired, and the like. An expedient range would be about 250:1 to 1:1 weight ratio of emulsifier:modifier, though operability outside of this range is feasible.

Aqueous medium normally is employed with the emulsifier, though other components such as glycols may be added for lower temperature polymerizations when desired. The amount of water and glycol employed is a matter of convenience as to amounts of materials to handle and is not limiting as far as making the agitated admixture of emulsifier:modifier is concerned. Supplemental water for the emulsion polymerization process itself can be later added at that stage.

Initiators

Free-radical initiators useful in the emulsion polymerization employing our invention include any of the broad groups of compounds utilized for the purpose in emulsion polymerization systems. These include redox initiator systems such as ferrous sulfate/hydrogen peroxide, potassium persulfate/sodium bisulfite, and the like, and more particularly the free-radical initiators classed as the monomer-soluble organoperoxides and azo compounds. Amounts expediently employed are of the order of about 0.01 to 5 phm, more preferred about 0.03 to 1 phm.

Exemplary catalysts include di-t-butylperoxide, benzoyl peroxide, lauroyl peroxide, t-butyl peracetate, t-butyl perbenzoate, dicumyl peroxide, 2,5-dimethyl-2,5-di(t-butylperoxy)hexane, t-butyl hydroperoxide, cumene hydroperoxide, p-menthane hydroperoxide, cyclopentane hydroperoxide, diisopropylbenzene hydroperoxide, p-t-butylcumene hydroperoxide, pinene hydroperoxide, 2,2'-azobis(2-methylpropionitrile), and the like, and mixtures thereof.

Monomers

The coagitated organosulfur compounds are useful as modifiers in the free radical polymerization of monomers polymerizable in emulsion polymerization systems, such as polymers of conjugated dienes from which elastomers may be obtained. The polymerizable conjugated dienes include those containing 4 to 12, preferably for commercial availability 4 to 8, carbon atoms per molecule. Examples of these monomers include 1,3-butadiene, isoprene, chloroprene, piperylene, 2-methyl-1,3-pentadiene, 2,3-dimethyl-1,3-butadiene, 1,3-octadiene, 5,6-diethyl-1,3-octadiene, and the like. The conjugated dienes can be polymerized to form homopolymers or copolymers of two or more.

Polymers of conjugated dienes include also copolymers formed by polymerizing one or more conjugated dienes with one or more copolymerizable monovinyl-substituted or propenyl-substituted aromatic compounds, such as those of 8 to 20, more particularly for commercial availability 8 to 12, carbon atoms per molecule, including styrene, various of the alkylstyrenes such as p-methylstyrene, 1-propenylbenzene or beta-methylstyrene, halostyrenes such as 2,3-dichlorostyrene; and also other copolymerizable ethylenically unsaturated monomers including the nitriles such as acrylonitrile or methacrylonitrile, esters of acrylic and methacrylic acid, e.g., ethyl acrylate and methylmethacrylate, vinyl esters such as vinyl acetate, other vinyl compounds such as vinyl chloride; and the like.

Coagitated modifiers of our invention also are useful in the preparation of SAN type resins, i.e., copolymers of styrene or substituted styrenes with the vinyl nitriles. Substituted styrenes include those of 8 to 20 carbon atoms per molecule such as alpha-methylstyrene, ortho-, meta-, or p-alkyl aromatic substituted styrenes; o-, m-, or p-halogenated styrenes wherein the halogen can be any of fluorine, chlorine, bromine, or iodine; and the vinyl nitriles include those of 3 to 12 carbon atoms per molecule such as acrylonitrile, methacrylonitrile, and the like, all as prepared in emulsion systems modified with organosulfur molecular weight modifiers. The coagitated modifiers further are useful in preparing copolymers of styrene and acrylate including any of the esters of acrylic and methacrylic acid such as methyl, ethyl, butyl, acrylates and methacrylates. Latexes of these latter copolymers are particularly suitable for latex base paints.

A further class of polymers made in emulsion systems which can benefit from the process of our invention of employing preagitated modifiers are the ABS compositions made by the emulsion process. In the ABS process, an emulsion or latex of an elastomer is first prepared, and a polymerizable monomer or various combinations of monomers such as the styrenes, vinylnitriles, acrylates, then are co- or terpolymerized in the presence of the elastomeric dispersion.

Polymerization Conditions

Polymerization conditions of temperature, time, pressure, and the like can range widely, depending upon particular materials and reactor conditions desired or convenient to employ, the monomers involved, relative volatility thereof, amounts of water, and equipment involved.

Polymerization commonly is carried out by continuously agitating the polymerization emulsion at polymerization temperatures expediently in the range of about $-40°$ to $+100°$ C., preferably about $0°$ to $50°$ C. The pH range can vary widely such as about 1 to 12, and presently preferably about 7 to 10.8.

After the degree or extent of polymerization desired has been accomplished, the polymerization reaction can be terminated with a shortstop. An oxidant usually is added to protect the polymer. The emulsion process results in a latex from which the polymer then is recovered by a process known as creaming, i.e., the addition of an aqueous salt solution such as sodium chloride solution, and coagulation of the polymeric product by the addition of a dilute acid such as sulfuric acid. The product then is collected by filtration, washed, dried in conventional drying equipment.

The polymers can be compounded with stabilizers, antioxidants, fillers, pigments, reinforcing agents and such other additives as may be required.

EXAMPLES

The following examples are intended to further illustrate our invention. In these runs both the coagitation and the polymerization steps are carried out under an inert atmosphere, e.g., nitrogen. Particular species employed, particular conditions, particular amounts used in the examples, are intended to be illustrative and not limitative of the reasonable and proper scope of our invention.

EXAMPLE I

A series of runs was conducted employing a mercaptan according to the following recipe:

| Recipe | Parts by Weight |
|---|---|
| Emulsifier Solution | |
| potassium salt of a disproportionated rosin acid | 4.6 |
| potassium hydroxide | 0.128 |
| potassium chloride | 0.3 |
| sodium alkylnaphthalene sulfonate | 0.2 |
| tetrahydrate of the tetrasodium salt of ethylenediamine tetraacetic acid | 0.02 |
| water | 170±5 |
| Modifier | |
| mercaptan (t-hexadecyl mercaptan in Runs 1 and 2, t-dodecyl mercaptan in Run 3) | 0.5 |
| Monomer | |
| styrene | 30 |
| butadiene | 70 |
| Initiator | |
| p-menthane hydroperoxide | 0.096 |
| Activator Solution | |
| tetrahydrate of the tetrasodium salt of ethylenediamine tetraacetic acid | 0.048 |
| $FeSO_4 \cdot 7 H_2O$ | 0.015 |
| $NaSO_2CH_2OH \cdot 2H_2O$ | 0.075 |
| water | 10 |
| Polymerization Time, Hrs. | Variable |
| Polymerization Temperature, ° C. | 5 |
| Shortstop | |
| sodium dimethyl dithiocarbamate | 0.24 |
| Antioxidant | |
| tri(nonylphenyl) phosphite | 1.5 |

The polymerization recipe ingredients were charged to the reactor in the order: (1) coagitated mixture of mercaptan with emulsifier solution, (2) monomers, (3) initiator, (4) these ingredients were preemulsified for about 0.5 hour to enable the reactor contents to reach the polymerization temperature, and (5) activator solution. At the conclusion of the polymerization period, each run was terminated with shortstop and antioxidant was added. The latex then was creamed by the addition of aqueous sodium chloride solution, and the polymer coagulated by the addition of dilute sulfuric acid. The rubber was collected by filtration, washed, and dried in an air oven.

In Run 1, the $C_{16}$ organosulfur compound and the emulsifier solution were combined and coagitated. In comparison Run 2, preagitation was omitted. In comparison Run 3, preagitation again was omitted and the organosulfur compound employed was t-dodecyl mercaptan. The preagitation in Run 1 was carried out for 2 hours at 95° C. by ultrasonic vibration (Model G140-25, Ultrasonic Generator, National Ultrasonic Corp., operated at 25 kc).

TABLE I

| | Hrs. | Remaining Mercaptan wt. % | Conversion wt. % | |
|---|---|---|---|---|
| Run 1 | 1.5 | 56.1 | 18.5 | t-$C_{16}$SH preagitated, r = 3.38 |
| | 2.5 | 33.9 | 30.5 | |
| | 3.5 | 22.5 | 42.5 | |
| | 4.3 | 17.8 | 52.0 | |
| Run 2 | 1.5 | 91.7 | 19.5 | t-$C_{16}$SH not preagitated, i.e., handled conventionally, r = 0.38 |
| | 2.5 | 85.8 | 32.0 | |
| | 3.6 | 84.9 | 46.0 | |
| | 4.4 | 82.2 | 56.0 | |
| Run 3 | 1.6 | 63.3 | 20.5 | t-$C_{12}$SH not preagitated, i.e., handled conventionally, r = 2.26 |
| | 2.6 | 48.2 | 33.5 | |
| | 3.6 | 34.6 | 46.0 | |

These data clearly demonstrate that preagitation of mercaptan-soap solution admixtures markedly increased the efficiency of the modifier. Preagitation raised the regulating index, r, of t-hexadecyl mercaptan from 0.38 to 3.38, substantially in excess of 2.26, the value of t-dodecyl mercaptan. Preagitation of t-hexadecyl mercaptan with the emulsifier solution resulted in an increased utilization of the modifier. The modifier was only approximately 15 percent consumed without preagitation at 50 percent conversion, whereas it was approximately 77 percent consumed at the same conversion when preagitated. Depletion of the preagitated t-hexadecyl mercaptan is seen from Table I to be much more favorable when compared with that of t-dodecyl mercaptan and the t-$C_{16}$ mercaptan used without our preagitation in that r is increased from 0.38 to 3.38 thus not exceeding the optimum value of about 4 (Uraneck and Burleigh, loc. cit.).

EXAMPLE II

A further series of runs was conducted in accordance with the following recipe:

| Recipe | Parts by Weight |
|---|---|
| Emulsifier Solution | |
| potassium salt of a disproportionated rosin acid | 4.6 |
| potassium hydroxide | 0.12 |
| potassium chloride | 0.3 |
| sodium alkylnaphthalene sulfonate | 0.2 |
| tetrahydrate of tetrasodium salt of ethylenediamine tetraacetic acid | 0.02 |
| water | 170±5 |
| Modifier | |
| t-dodecyl mercaptan | variable |
| Monomers | |
| styrene | 30 |
| butadiene | 70 |
| Initiator | |
| p-menthane hydroperoxide | 0.096 |
| Activator Solution | |
| tetrahydrate of tetrasodium salt of ethylenediamine tetraacetic acid | 0.048 |
| $FeSO_4 \cdot 7H_2O$ | 0.015 |
| $NaSO_2CH_2OH \cdot 2H_2O$ | 0.075 |
| water | 10 |
| Polymerization Time, Hrs. | variable |
| Polymerization Temperature, ° C. | 5 |
| Shortstop | |
| sodium dimethyl dithiocarbamate | 0.24 |
| Antioxidant | |
| tri(nonylphenyl) phosphite | 1.5 |

The polymerizations were carried out in the same manner as described in Example I, except that the preagitated (WARING BLENDOR, 20 minutes, 100°–210° F.) combination of emulsifier solution and organosulfur compound was added incrementally (⅔ initially, ⅓ later) to the polymerization mixture.

TABLE II

| Run No. | 4 | 5 | 6 | 7 | 8 | 9 |
|---|---|---|---|---|---|---|
| t-Dodecyl mercaptan | | | | | | |
| initial increment, phm | 0.199 | 0.133 | 0.135 | 0.134 | 0.134 | 0.134 |
| later increment, phm | — | 0.066 | 0.066 | 0.066 | 0.066 | 0.066 |
| total, phm | 0.199 | 0.199 | 0.201 | 0.200 | 0.200 | 0.200 |
| at % conversion[a] | 0. | 14 | 23 | 32 | 40 | 47 |
| Polymerization period, hours | 4.6 | 4.4 | 4.5 | 4.3 | 4.4 | 4.4 |
| Conversion, % | 58.7 | 60.1 | 60.5 | 60.3 | 59.7 | 59.4 |
| ML-4[b] | 68.5 | 61 | 58 | 57.5 | 58 | 69 |
| Inherent viscosity | 2.32 | 2.26 | 2.14 | 1.79 | 2.21 | 2.39 |
| Gel, %[c] | 0 | 0 | 0 | 0 | 0 | 0 |

[a]Percentage conversion which had been obtained at time of addition of later increment.
[b]ASTM D 1646–63.
[c]Determined in accordance with U.S. 3,278,508 col. 20 note b.

These data show by Mooney and inherent viscosity values that more efficient utilization of the organosulfur modifier results from the incremental addition of the emulsifier-modifier preagitated mixture. From these data, it would appear that the preferred point for adding the second increment was at about the 30% conversion level with these particular monomers and operating conditions.

The polymers obtained by the process of our invention can be employed in the fabrication of tires, belts, gaskets, shoe soles, tubing, and for other purposes.

Other modifications and alterations of this invention will become apparent to those skilled in the art from the foregoing description and examples and it should be understood that this invention is not to be unduly limited thereto.

We claim:

1. In an admixture of emulsifier and organosulfur compound, useful in emulsion polymerization of olefinically unsaturated monomers, the improvement which comprises preparing said admixture by the process which comprises coagitation of at least one aqueous emulsifier with at least one organosulfur compound to produce a coagitated admixture, wherein said coagitation refers to strong and thorough mixing of said organosulfur compound with said aqueous emulsifier in a manner so as to afford a significant reduction in the particle size of said organosulfur compound in said aqueous emulsifier.

2. The admixture of claim 2 wherein the coagitation is sufficient to effectuate a significant increase in the regulating index of said organosulfur compound upon introduction of said admixture into an aqueous emulsion polymerization system.

3. The admixture according to claim 1 wherein said coagitation is accomplished by tumbling, ultrasonic vibration, or high speed shearing action.

4. The admixture according to claim 1 wherein said organosulfur compound is a mercaptan, dialkyldixanthogen, diaryldisulfide, tetraalkylthiuram disulfide, or mixture.

5. The admixture according to claim 4 wherein said organosulfur compound is a mercaptan.

6. The admixture according to claim 5 wherein said mercaptan is an alkyl mercaptan containing up to 20 carbon atoms per molecule.

7. The admixture according to claim 6 wherein said alkyl mercaptan contains 8 to 20 carbon atoms per molecule.

8. The admixture according to claim 7 wherein said alkyl mercaptan is a tertiary alkyl mercaptan.

9. The admixture according to claim 5 wherein said emulsifier is at least one rosin acid soap, disproportionated rosin acid soap, fatty acid soap, alkarylsulfonate, nonionic emulsifier, or mixture.

10. The admixture according to claim 9 wherein said mercaptan is t-hexadecylmercaptan, and said emulsifier is a potassium salt of disproportionated rosin acid and a sodium alkylnaphthalene sulfonate.

11. The admixture according to claim 9 wherein said mercaptan is t-dodecylmercaptan, and said emulsifier is a potassium salt of disproportionated rosin acid and a sodium alkylnaphthalene sulfonate.

12. The admixture according to claim 5 wherein said mercaptan is n-octyl mercaptan, n-dodecyl mercaptan, t-nonyl mercaptan, t-hexadecyl mercaptan, t-octadecyl mercaptan, t-eicosyl mercaptan, sec-octyl mercaptan, sec-tridecyl mercaptan, cyclododecyl mercaptan, cyclododecadienyl mercaptan, 1-naphthylenethiol, or mixture of two or more.

13. The admixture according to claim 1 wherein said organosulfur compound is a bis(tetrahydrofurfural xanthogen), diphenyl disulfide, tetramethyl thiuram disulfide, 2-mercaptobenzothiazole, or mixture of two or more.

14. In an admixture of emulsifier and organosulfur compound, useful in emulsion polymerization of olefinically unsaturated monomers, the improvement which comprises preparing said admixture by the process which comprises admixing at least one aqueous emulsifier with at least one organosulfur compound and coagitating the resulting admixture sufficiently to produce a coagitated admixture exhibiting an increased regulating index for said organosulfur compound as a molecular weight modifier in an aqueous emulsion polymerization process, wherein said emulsifier is an anionic or nonionic emulsifier; said organosulfur compound molecular weight modifier is a mercaptan, dialkyl dixanthogen, diaryl disulfide, tetraalkyl thiuram mono- or disulfide, or mercaptothiazole.

15. An admixture of at least one emulsifier and organosulfur compound prepared by admixing (I) at least one organosulfur compound selected from the group consisting of mercaptans, dialkyldixanthogens, diaryldisulfides, tetraalkylthiuram monosulfides, tetraalkylthiuram disulfides, and mixtures, with (II) at least one emulsifier selected from the group consisting of rosin acid soaps, disproportionated rosin acid soaps, fatty acid soaps, alkarylsulfonates, nonionic emulsifiers, and mixtures, and (III) water, glycol, or mixture, wherein the proportion of I:II is in the range of 1:250 to 1:1 weight ratio, and agitating said admixture with shearing and for time sufficient in combination to effect a significant reduction in particle size of said organosulfur compound in said (III).

16. The admixture of claim 15 wherein said organosulfur compound is a mercaptan.

17. The admixture of claim 16 wherein said organosulfur compound is t-hexadecylmercaptan or t-dodecylmercaptan.

* * * * *